United States Patent [19]

Nevai

[11] 4,033,461

[45] July 5, 1977

[54] CLEANING AND DRAINING DEVICE FOR SINK

[75] Inventor: Bela B. Nevai, Dobbs Ferry, N.Y.

[73] Assignee: Belaco International Ltd., Dobbs Ferry, N.Y.

[22] Filed: Feb. 5, 1976

[21] Appl. No.: 655,416

[52] U.S. Cl. .................................... 211/86; 4/189; 108/24; 108/25; 108/27; 206/557; 211/126; 220/23.8

[51] Int. Cl.² ........................................ A47J 19/00

[58] Field of Search .............. 211/126, 127, 41, 86; 206/72; 4/189, 190, 290; 259/18; 220/23.8; 108/24, 25, 27

[56] References Cited

UNITED STATES PATENTS

| | | | |
|---|---|---|---|
| 1,389,908 | 9/1921 | Shults et al. | 4/189 X |
| 1,587,693 | 6/1926 | Beland et al. | 4/189 |
| 1,588,271 | 6/1926 | Saint et al. | 206/72 X |
| 2,664,005 | 12/1953 | Kosinski | 206/72 |
| 3,091,339 | 5/1963 | Marra et al. | 4/290 X |
| 3,120,323 | 2/1964 | Sparling | 211/126 X |
| 3,405,810 | 10/1968 | Rogus | 211/126 |
| 3,549,018 | 12/1970 | Wilson | 211/126 |
| 3,675,815 | 7/1972 | Rehrig | 211/126 X |
| D. 220,637 | 5/1971 | Swett et al. | 206/72 X |
| Re. 26,350 | 2/1968 | Wilson | 211/126 X |

FOREIGN PATENTS OR APPLICATIONS 1,560,076  2/1969  France ................. 211/126

*Primary Examiner*—Roy D. Frazier
*Assistant Examiner*—Robert W. Gibson, Jr.
*Attorney, Agent, or Firm*—Lackenbach, Lilling & Siegel

[57] ABSTRACT

A cleaning and draining device for a sink includes a rectangular basket having an open top end formed with a peripheral support frame or rim extending about the open end. Opposite portions of the rim or frame are adapted to rest on and be slidingly supported on opposite upper edges of the sink. The rim is enlarged at one of the supported ends of the basket to form a generally rectangular and planar tray which is adapted to support cleaning tools, soap and the like, and is arranged to drain into the basket. The walls of the basket are apertured to permit drainage into the sink and are strengthened with reinforcing ribs to prevent excessive deformation of the basket when the same is filled with fruits, vegetables, meats or the like to be cleaned.

22 Claims, 4 Drawing Figures

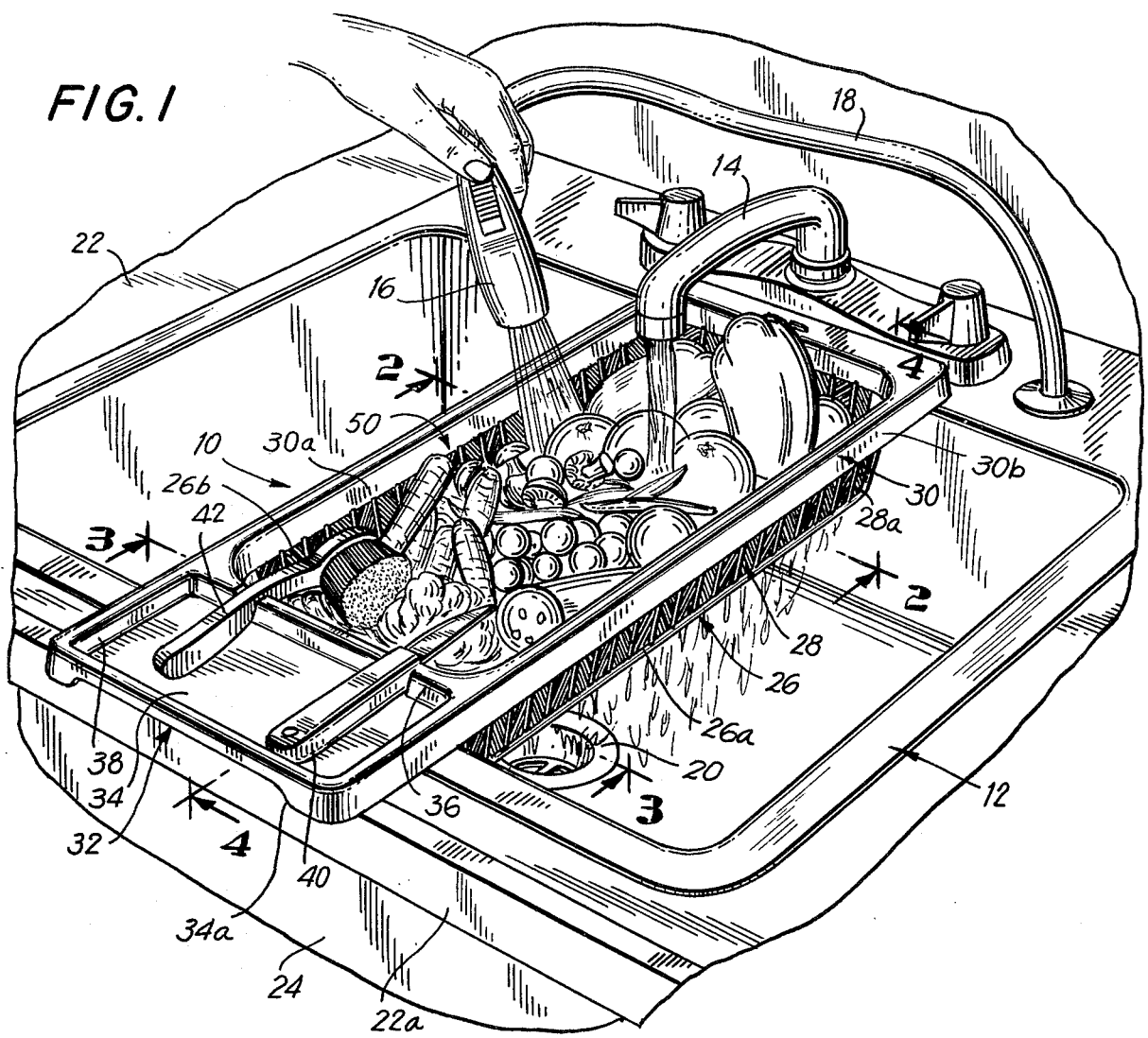
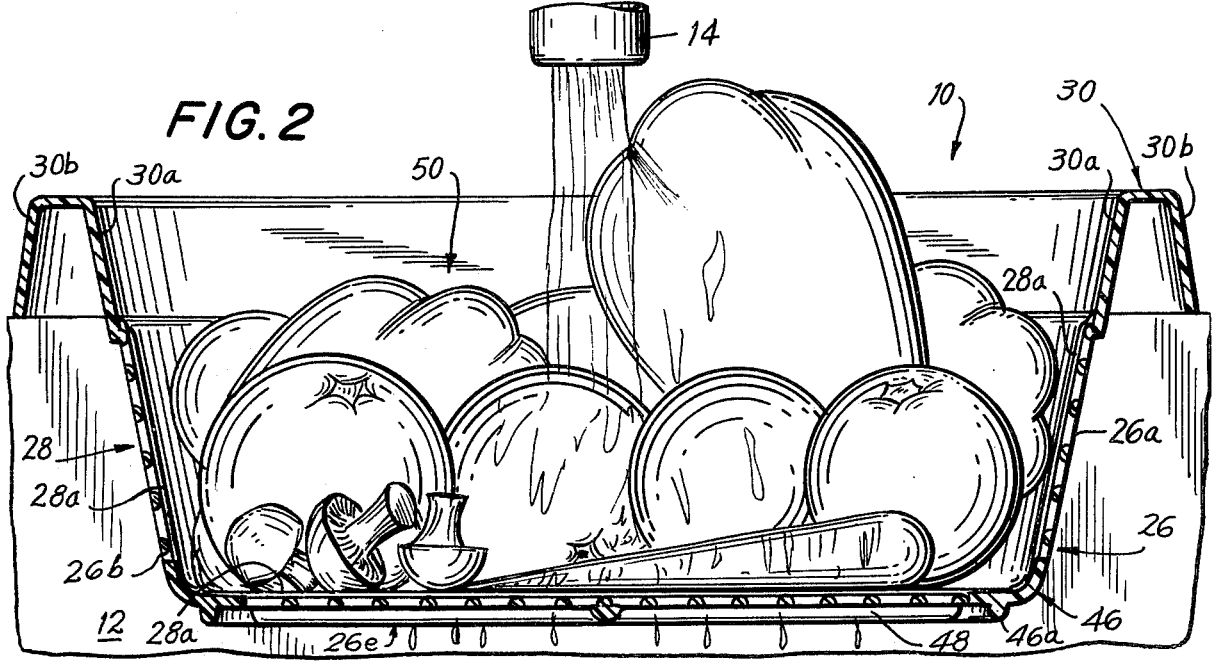

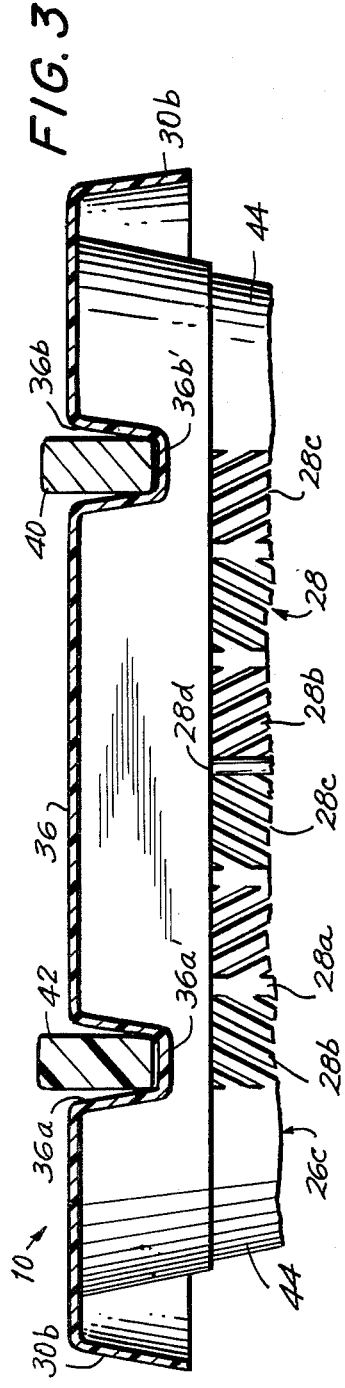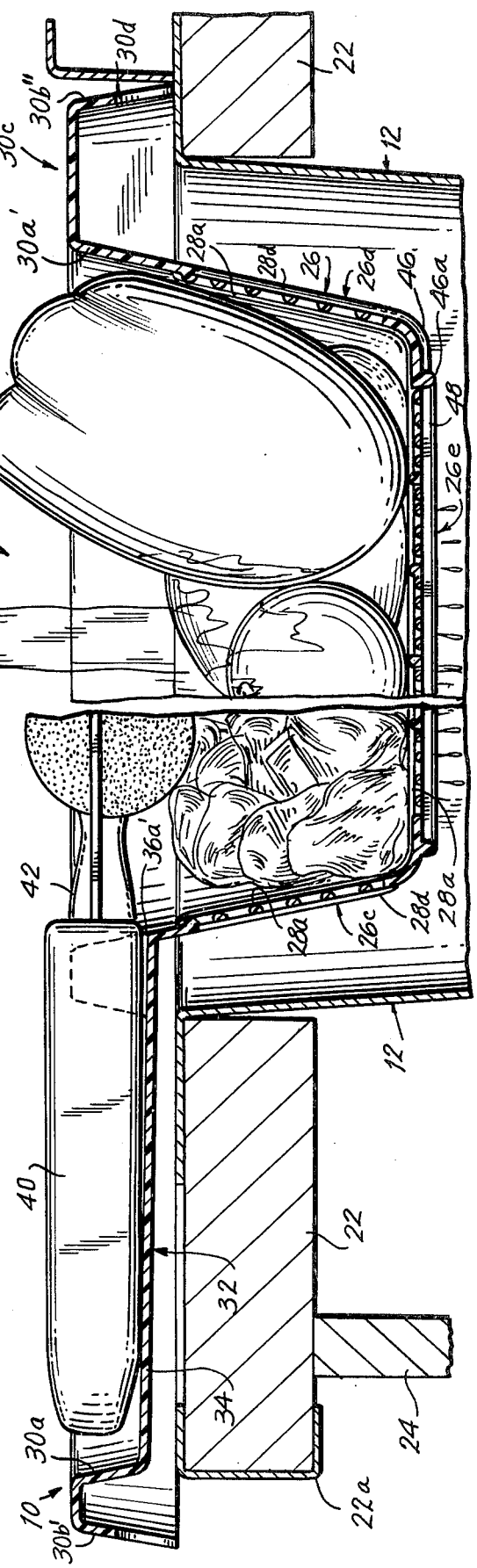

CLEANING AND DRAINING DEVICE FOR SINK

BACKGROUND OF THE INVENTION

The present invention generally relates to cleaning and draining devices for sinks, and more specifically to such a device of novel construction which includes a tray adapted to support cleaning tools, soap and the like.

Numerous dish drainers are known. Some of the known constructions are exemplified in the following U.S. Pats.: 62,082; 275,755; 958,857; 1,389,908; and 3,091,399. The dish drainers disclosed in these patents are typically made of metal and are relatively shallow in depth as compared to their length spanning the opposite or supporting portions of the sink. Most of these prior art draining devices, having been patented before the advent of hand-held sprayer attachments now available with sinks, primarily relied upon the discharge of water from the faucet to clean the fruits, vegetables and the like. The degrees of movement of a faucet are normally limited and, therefore, generally shallow draining devices were used since this facilitated the washing of the fruits or vegetables, most of which were disposed at the top of the drainer and thereby exposed for washing.

While the prior art drainers included rim portions for slidingly supporting the drainer on opposite edges of a sink, these devices have not hitherto provided an auxiliary tray which provided a surface adapted to support cleaning tools, soap and the like. The absence of such a tray could be an inconvenience, particularly where a kitchen countertop is otherwise covered with various items.

Additionally, being made of metal, the prior art draining devices are expensive to manufacture, are heavier and less convenient to use.

SUMMARY OF THE INVENTION

Accordingly, it is an object of the present invention to provide a cleaning and draining device for a sink which does not have the above-described disadvantages associated with comparable prior art devices.

It is another object of the present invention to provide a device as suggested above which is simple in construction and economical to manufacture.

It is still another object of the present invention to provide a cleaning and draining device of the type under discussion which includes a auxilliary tray adapted to support cleaning tools, soap and the like.

It is yet another object of the present invention to provide a cleaning and draining device as suggested in the above objects which is integrally molded out of a plastic material and which is relatively deep as compared to the length thereof spanning across the opposite edges of the sink to accommodate more items to be cleaned than have heretofore been possible with most prior art devices.

It is a further object of the present invention to provide a cleaning and draining device for a sink which is particularly suited for use with a hand-held sprayer attachment of a sink.

In order to achieve the above objects, as well as others which will become apparent hereafter, a cleaning and draining device for a sink in accordance with the present invention comprises a generally rectangular basket having a bottom, side and end walls, and an open top end. At least one of said walls is foraminous to permit water drainage therethrough. Support portions are provided which extend outwardly from opposite sides of said basket and are adapted to rest on and be slidably supported on opposite upper edges of the sink. Said basket is provided with a tray thereon adapted to support cleaning tools, soap and the like. In accordance with the presently preferred embodiment, at least one of said support portions comprises said tray. According to another feature of the present invention, the cleaning and draining device is integrally molded from a plastic material and the basket of the draining device has a height or depth to length ratio greater than approximately 0.175, and advantageously greater than approximately 0.2.

BRIEF DESCRIPTION OF THE DRAWINGS

A presently preferred embodiment of the present invention will now be described in connection with the drawings, in which:

FIG. 1 is a perspective view of a cleaning and draining device for a sink in accordance with the present invention, shown being used to clean and wash vegetables by use of both the sink faucet as well as a hand-held sprayer attachment, and also showing a tray in accordance with the present invention which is integrally formed with the cleaning and draining device for supporting cleaning tools, soap and the like;

FIG. 2 is an enlarged cross-sectional view of the cleaning and draining device shown in FIG. 1, taken along line 2—2;

FIG. 3 is an enlarged cross-sectional view of the device shown in FIG. 1, taken along line 3—3; and FIG. 4 is an enlarged fragmented cross-sectional view of the device shown in FIG. 1, taken along line 4—4.

DESCRIPTION OF THE PREFERRED EMBODIMENT

Referring now to the drawings, in which the identical or similar parts are designated by the same reference numerals throughout, and first referring to FIG. 1, the cleaning and draining device in accordance with the present invention is generally designated by the reference numeral 10.

The cleaning and draining device 10 is primarily intended to be used in conjunction with a sink 12 having a conventional faucet 14 and advantageously provided with a hand sprayer unit 16 connected by means of a hose 18 to a conventional bypass valve to permit selective discharge through either the faucet 14 or the hand sprayer unit 16. It will be evident that the area of coverage or water discharge possible with the sprayer unit 16 is substantially greater than that possible with the faucet 14. The hand sprayer unit 16 is conventional with most modern sinks. The sink 12 is also provided with a conventional drain 20.

As best shown in FIGS. 1 and 4, the sink 12 is formed from a planar sheet of material, such as stainless steel, which has an upper peripheral ledge or rim and the sink is positioned within a suitably dimensioned opening in a counter top 22. Normally, the edge of the counter top is covered or finished with an edge molding 22a as shown. The counter top 22 is mounted on a cabinet 24 in a conventional manner.

The draining and cleaning device 10 includes a relatively deep rectangular basket 26 which has side walls 26a and 26b, end walls 26c and 26d, and a bottom wall 26e. The basket, therefore, as shown in the figures, is provided with an open top end.

At least one of the walls 26a–26e is provided with a foraminous portion to permit water drainage therethrough. Only one of these walls need provide drainage in accordance with the broader aspect of the present invention. However, in a presently preferred embodiment, the major portions 28 of each of the walls are foraminous and provided with an array of apertures to be more specifically described below.

A peripheral support frame or rim generally indicated by the reference numeral 30 extends about the open top end of the basket 26, the rim including support portions extending outwardly from opposite sides of the basket and adapted to rest on and be slidably supported on opposite upper edges of the sink 12. While the specific configuration of the support frame 30 is not critical, the frame in accordance with the presently preferred embodiment has a cross-sectional configuration which is generally an inverted V-shape having an inner leg portion or skirt 30a and an outer leg portion or skirt 30 b, as best shown in FIGS. 2–4. The outer leg portion 30b flares outwardly and is adapted to rest on the sink surfaces as shown.

An important feature of the present invention is the provision of a generally planar portion in the nature of a tray 32 which is associated with and cooperates with the basket 26 and which is adapted to support cleaning tools, soap and the like. While the tray 32 can be disposed as desired about the basket 26, the tray 32 in accordance with the presently preferred embodiment forms one of the support portions of the draining device 10 to thereby serve a dual function.

The tray 32 has a bottom wall 34 which is recessed from the upper edge of the rim 30. In the presently preferred embodiment, the opposing support portions of the rim 30 which rest upon the sink are advantageously arranged to maintain the basket 26 generally horizontally when the support portions rest on the sink. Also, while not critical for the present invention, the tray 32 is itself advantageously arranged in a generally horizontal plane when the support portions rest on the sink 12. However, in order to improve drainage of water accumulated on the tray 32, the bottom wall 34 is advantageously downwardly inclined in the direction of the basket 26.

A partition wall 36 cooperates with the rim 30 to form a peripheral upwardly projecting surface 38 which extends about the periphery of the bottom wall 34. The provisions of indentations or grooves 36a and 36b, best shown in FIG. 3, insures that the water accumulated on the tray 32 drains only into the basket 26 and not onto the counter top 22, cabinet 24 or the floor below. The recesses or grooves 36a and 36b are spaced from each other as shown and are dimensioned for receiving handles of cleaning and cutting tools or the like. By way of illustration only, the handle 40 of a knife is shown positioned within the recess 36b while the handle 42 of a cleaning brush is positioned within the recess 36a. Advantageously, the grooves or recesses 36a and 36b are inwardly and downwardly tapered and dimensioned to maintain the tool handles 40, 42 above the bottom wall 34 when received as shown to form spaces 36a' and 36b' which permit water drainage through the recesses or grooves. To this end, the bottom walls of the recesses or grooves 36a and 36b are co-planar and form part of the bottom wall 34 of the tray 32 to facilitate drainage of water. The partition wall 36 is optional and, when it is provided, need include only one groove or recess but may, of course, include two or more such grooves or recesses.

The end outer leg portion or skirt 30b' of the tray 32, as well as the outer leg portion 30b'' at the opposite side of the basket 26 are shown to be provided, in FIGS. 1 and 4, with cut-out portions 34a and 30d respectively. These cut-outs are optional and are primarily intended to reduce material costs in the manufacture of the draining device 10. Other cut-out portions as well as slight modifications in design which produce further economies may be evident to those skilled in the art, but all such modifications which do not alter the basic features or characteristics of the present invention are intended to come within the scope of this invention.

As suggested above, the opposing support portions which form part of the peripheral frame 30 are integrally formed with the basket 26. In the presently preferred embodiment, the drainage device 10 is molded as a unitary construction from any suitable plastic material.

Particularly where the draining device 10 is made from a flexible material such as plastic, adequate reinforcement is advantageously provided to permit the device 10 to support substantial weights within the basket 26 without excessive drooping or deformation. The weakest wall surfaces of the device 10 are the apertured regions 28 where drainage takes place due to the substantial open nature of these walls. To this end, solid corner walls 44 are provided which are connected at their upper ends to the peripheral support frame or rim 30, at the support portions thereof adapted to rest on the sink. Additionally, as best shown in FIGS. 2 and 4, there is provided a lower support frame or peripheral rim 46 which extends about the periphery of the bottom wall 26e and is connected to the lower ends of the corner walls 44. In this way, the support frame or rim 30, the lower support frame 46 and the corner walls 44 together form a substantially rigid open frame which is closed by the apertured wall portions 28 to be described. The lower support frame 46 also is shown to be provided with a downwardly projecting peripheral lip 36a which supports the device 10 when it is rested on a flat surface and serves to additionally reinforce the device 10 and resist deformations thereof.

As best shown in FIG. 3, the regions 28 of each of the walls between the corner walls 44 are provided with an array of apertures. While the details of only the front wall 26c is shown in FIG. 3, it will be understood that the constructions of the other walls are substantially similar and the description which now follows is equally applicable to all of these walls.

The apertured portion of each wall is formed by a plurality of generally parallel longitudinal spaced ribs 28a. Spaced elongate cross members 28b extend between each pair of adjacent spaced ribs 28a to form elongate slots 28c. Advantageously, the parallel ribs 28a are uniformly spaced from each other as shown, as are the elongate cross members 28b. In this manner, the slots 28c are generally uniform in length and width on the apertured portions of the wall. The configuration of the openings is not critical. However, it is advantageous that the openings be sufficiently large to permit free and complete drainage of the water which enters the basket 26.

In the presently preferred embodiment, the elongate cross members 28b are inclined at a uniform angle with respect to the parallel ribs 28b and the direction of inclination of the elongate cross members alternates at successive ones of the parallel ribs 28b. In this manner, the elongate cross members 28b on both sides of a single rib 28a form mirror images with respect thereto.

The draining device 10 of the present invention advantageously has a relatively deep basket 26 to accommodate a large quantity of vegetables, fruits and the like. Although several layers of vegetables or the like can be accommodated within the device 10, these can nevertheless be adequately washed when the sink 12 is provided with a hand sprayer unit 16. In accordance with one feature of the present invention, and in conjunction with a draining device 10 as described above, the height and length of the basket 26 are advantageously selected to provide a ratio of the height to the length which is greater than approximately 0.175. The present invention particularly contemplates ratios of height to length of the basket at least equal to 0.2.

As best shown in FIGS. 2 and 4, the side walls 26a and 26b as well as the end walls 26c and 26d are inwardly inclined from the open end of the basket 26 so that the open end had a greater area than that of the bottom wall. This is not a critical feature of the present invention. However, with the construction described, one example of satisfactory basket dimensions, by way of illustration only, is where the length of the basket at the open end is approximately 15½ inches and the length at the bottom wall 26e is approximately 14 inches, while the height of the basket is 3 inches. With these dimensions, the height to length ratio is approximately 0.2. This represents a convenient and practical size for most household uses.

Where relatively deep baskets 26 are used, as suggested above, which can receive fruits and vegetables having substantial weight, it may be advantageous to provide additional reinforcing means in addition to those described above. Referring to FIGS. 2-4, the side and end walls 26a-26c are shown to be integrally connected and depend from the lower peripheral region of the inner leg portion or skirt 30a. The abovementioned longitudinal ribs 28a reinforce the basket 26 in the vertical direction to prevent excessive elongation of the side and end walls 26a-26b. To this end, there may also advantageously be provided longitudinal reinforcing external ribs 28d on the front and end walls 26c and 26d. Clearly, such external ribs can also be provided, if necessary, on the side walls 26a and 26b.

To prevent excessive deformation of the bottom wall 26e of the basket 26, there is advantageously provided a plurality of external reinforcing ribs 48 which extend between and are integrally formed with the lower support frame 46. The specific arrangement of the external reinforcing ribs 48 is not critical and two such ribs arranged in X configuration may be provided which extend between opposing corner walls 44 of the basket. In the presently preferred embodiment, the reinforcing ribs 48 have a height substantially equal to that of the peripheral lip 46a so that when the basket is rested on a flat surface, both the peripheral lip 46a and the reinforcing ribs 48 support the bottom wall 25e and maintain the desired spacing of the bottom wall above the surface upon which the device 10 is rested to assure proper drainage.

It is to be understood that the foregoing description of the embodiment illustrated herein is exemplary and various modifications to the embodiment shown herein may be made without departing from the spirit and scope of the invention.

What is claimed is:

1. A cleaning and draining device for a sink comprising a generally rectangular basket having a bottom, side and end walls, and an open top end; at least one of said walls being foraminous to permit water drainage therethrough; support portions extending outwardly from opposite sides of said basket adapted to rest on and be slidably supported on opposite upper edges of a sink, at least one of said support portions being generally planar to form a tray adapted to support cleaning tools, soap and the like, said tray being arranged in a generally horizontal plane when said support portions rest on the edges of the sink, and said tray including a recessed bottom wall provided with an upwardly projecting surface extending about the periphery of said bottom wall to permit drainage of water accumulated on said tray only into said basket.

2. A device as defined in claim 1, wherein said support portions form part of a peripheral support frame which extends about said open top end of said basket.

3. A device as defined in claim 2, wherein said support frame has a cross-sectional configuration which is generally an inverted V-shape having inner and outer leg portions, said basket being joined to said inner leg portion and said outer leg portion being adapted to rest and be slidable supported on the upper edges of the sink.

4. A device as defined in claim 1, wherein all of said walls of said basket are foraminous.

5. A device as defined in claim 4, wherein each of said basket walls is provided with an apertured portion.

6. A device as defined in claim 5, wherein said apertured portion is formed by a plurality of generally parallel spaced ribs, and spaced elongate cross members extending between each pair of adjacent spaced ribs to form elongate slots.

7. A device as defined in claim 6, wherein said parallel ribs are uniformly spaced from each other, and said elongate cross members are uniformly spaced from each other, whereby said slots are generally uniform in length and width on said apertured portion.

8. A device as defined in claim 1, further comprising external reinforcing ribs on said end walls.

9. A device as defined in claim 1, further comprising external reinforcing ribs on said bottom wall.

10. A device as defined in claim 9, wherein two spaced grooves or recesses are provided dimensioned for receiving handles of cleaning and cutting tools or the like.

11. A device as defined in claim 10, wherein said grooves or recesses are tapered and dimensioned to maintain the tool handles above said bottom wall, whereby water can drain through said grooves or recesses even when said tools are received therein.

12. A device as defined in claim 1, wherein the corners formed by said side and end walls are solid walls, said corner walls being connected at their upper ends to said support portions.

13. A device as defined in claim 12, further comprising a lower peripheral support frame extending about the periphery of said bottom wall and connected to the lower ends of said corner walls.

14. A device as defined in claim 1, wherein said side and end walls are each inwardly inclined from said open end whereby said open end has a greater area than that of said bottom wall.

15. A device as defined in claim 1, wherein said support portions are integrally formed with said basket.

16. A device as defined in claim 15, wherein the drainage device is molded as a unitary construction from a plastic material.

17. A device as defined in claim 1, wherein said support portions are arranged to maintain said basket generally horizontally when said support portions rest on the edges of the sink.

18. A device as defined in claim 1, wherein said bottom wall is downwardly inclined in the direction of said basket to aid water drainage thereinto.

19. A device as defined in claim 1, further comprising a partition wall at the side of said tray proximate to said basket, said partition wall being provided with at least one groove or recess extending to said bottom wall, whereby water on said tray can drain into said basket through said groove or recess.

20. A device as defined in claim 1, wherein the height and length of said basket are selected to provide a ratio of said height to said length greater than approximately 0.175.

21. A device as defined in claim 20, wherein said ratio is greater than approximately 0.2.

22. A cleaning and draining device for a sink comprising a generally rectangular basket having a bottom, side and end foraminous walls to permit water drainage therethrough, and an open top end; support portions extending outwardly from opposite sides of said basket adapted to rest on and be slidably supported on opposite upper edges of a sink, at least one of said support portions being generally planar to form a tray adapted to support cleaning tools, soap and the like, each of said basket walls being provided with an apertured portion formed by a plurality of generally parallel spaced ribs, and spaced elongate cross members extending between each pair of adjacent spaced ribs to form elongate slots, said parallel ribs being uniformly spaced from each other, and said elongate cross members being uniformly spaced from each other, whereby said slots are generally uniform in length and width on said apertured portion, and said elongate cross members being inclined at a uniform angle with respect to said parallel ribs and said elongate cross members alternate in the direction of inclination at successive ones of said parallel ribs, whereby said elongate cross members on both sides of a single rib form mirror images with respect thereto.

* * * * *